US012342130B2

(12) United States Patent
Ali

(10) Patent No.: US 12,342,130 B2
(45) Date of Patent: Jun. 24, 2025

(54) MEMS OPTICAL MICROPHONE

(71) Applicant: AAC Technologies Pte. Ltd., Singapore (SG)

(72) Inventor: Taimoor Ali, London (GB)

(73) Assignee: AAC Technologies Pte. Ltd., Singapore (SG)

(*) Notice: Subject to any disclaimer, the term of this patent is extended or adjusted under 35 U.S.C. 154(b) by 135 days.

(21) Appl. No.: 18/088,626

(22) Filed: Dec. 26, 2022

(65) Prior Publication Data

US 2024/0214749 A1 Jun. 27, 2024

(51) Int. Cl.
*H04R 23/00* (2006.01)

(52) U.S. Cl.
CPC ..... *H04R 23/008* (2013.01); *H04R 2201/003* (2013.01)

(58) Field of Classification Search
CPC ........................ H04R 23/008; H04R 2201/003
USPC .......................................................... 398/133
See application file for complete search history.

(56) References Cited

U.S. PATENT DOCUMENTS 11,533,569 B1* 12/2022 Kervran ............... H04R 23/008
2015/0365753 A1* 12/2015 Kropp .................. H04R 23/008 381/172
2016/0007108 A1* 1/2016 Lee .......................... H04R 1/08 381/111
2016/0007125 A1* 1/2016 Lee ...................... H04R 31/003 29/896.2
2017/0289703 A1* 10/2017 Bartl .................. G02B 27/4233
2021/0258700 A1* 8/2021 Kervran ............. G02B 26/0825
2022/0167096 A1* 5/2022 LaColle ............... H04R 23/008
2022/0182771 A1* 6/2022 Fang .................... H04R 23/008
2024/0214749 A1* 6/2024 Ali ......................... H04R 19/04

FOREIGN PATENT DOCUMENTS

CN 111263283 A * 6/2020 ............. H04R 19/04
CN 214070119 U * 8/2021
WO WO-2022156888 A1 * 7/2022

OTHER PUBLICATIONS

Kim et al; Towards a sub 15-dBA optical micromachined microphone; Mar. 2014; Acoustical Society of America; pp. 1-10. (Year: 2014).*

* cited by examiner

*Primary Examiner* — Amritbir K Sandhu
(74) *Attorney, Agent, or Firm* — Wiersch Law Group

(57) ABSTRACT

A MEMS optical microphone includes: a housing including an inner cavity and a sound port communicating the inner cavity with outside, a light source configured to emitting a light beam, a MEMS module including a membrane suspended above the sound port, and a first reflective coating coated on a surface of the membrane facing the light source and configured to reflect the light beam; a light detection unit configured to detecting light reflecting from the first reflective coating, including a photo detector configured to convert light intensity into photo current, and an optical filter with a variable transmittance hoisted above the photo detector. The MEMS optical microphone has wider dynamic range and higher sensitivity.

10 Claims, 15 Drawing Sheets

MEMS OPTICAL MICROPHONE

TECHNICAL FIELD

The present disclosure relates to MEMS microphone technologies, and in particular, to a MEMS optical microphone.

BACKGROUND

MEMS optical microphone is a new type of microphone. A MEMS optical microphone generally includes a light source, a micro-electro-mechanical system (MEMS) module with a membrane, a light detection unit, and an application specific integrated circuit (ASIC). The light source emits light to the MEMS module; the light detection unit receives light reflected by the MEMS module. The intensity of light received at the light detection unit varies with the membrane deflects due to external sound or pressure signal.

In related art, the light detection unit includes a photo detector and an optical filter hoisted above the photo detector. The light reflects from the membrane and directs to the photo detector where it first passes through a location on the optical filter of a given transmittance allowing a certain level of light intensity which converts into photo-current. When the pressure or sound signal varies, it changes the deflection of the membrane and hence the direction or path of the reflected light from the membrane. As a result, the reflected light follows different paths and passes through different locations on the optical filter that results in a variable photo-current.

However, the intensity of light entering the photo detector depends on the location on the optical filter through which the reflected light pass and results a distinct level of photo-current that measures the amount of external pressure signal, thus reducing the sensitivity of the MEMS optical microphone.

Therefore, it is necessary to provide a MEMS optical microphone with higher sensitivity.

SUMMARY

The purpose of the present disclosure is to provide a MEMS optical microphone with higher sensitivity.

The present disclosure provides MEMS (micro-electro-mechanical system) optical microphone, including: a housing including an inner cavity and a sound port communicating the inner cavity with outside; a light source configured to emitting a light beam; a MEMS module including a membrane suspended above the sound port; and a first reflective coating coated on a surface of the membrane facing the light source and configured to reflect the light beam; a light detection unit configured to detecting light reflecting from the first reflective coating, including a photo detector configured to convert light intensity into photo current; and an optical filter with a variable transmittance hoisted above the photo detector.

As an improvement, the transmittance of the optical filter varies along a linear direction between two edges of the optical filter.

As an improvement, the optical filter includes a central region with a maximum transmittance and an edge region with a minimum transmittance; the transmittance of the optical filter reduces radially from the central region towards the edge region.

As an improvement, the optical filter includes a plurality of gratings; each grating has a gradient of transmittance.

As an improvement, the grating is a linear grating or a ring grating.

As an improvement, the housing comprises a lid, a PCB opposite to the lid and a side wall connecting the lid and the PCB; the lid, the PCB and the side wall encloses the inner cavity.

As an improvement, the sound port is provided on the PCB; the MEMS module is mounted on the PCB and covers the sound port.

As an improvement, the light source and the light detection unit are both mounted on the lid.

As an improvement, the MEMS optical further includes a second reflecting coating coated on the lid; the light detection unit and the light source are both arranged on the PCB; the second reflecting coating are arranged opposite to the light source and the first reflective coating.

As an improvement, the light detection unit includes two adjacent photo detectors with respective optical filter above them.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
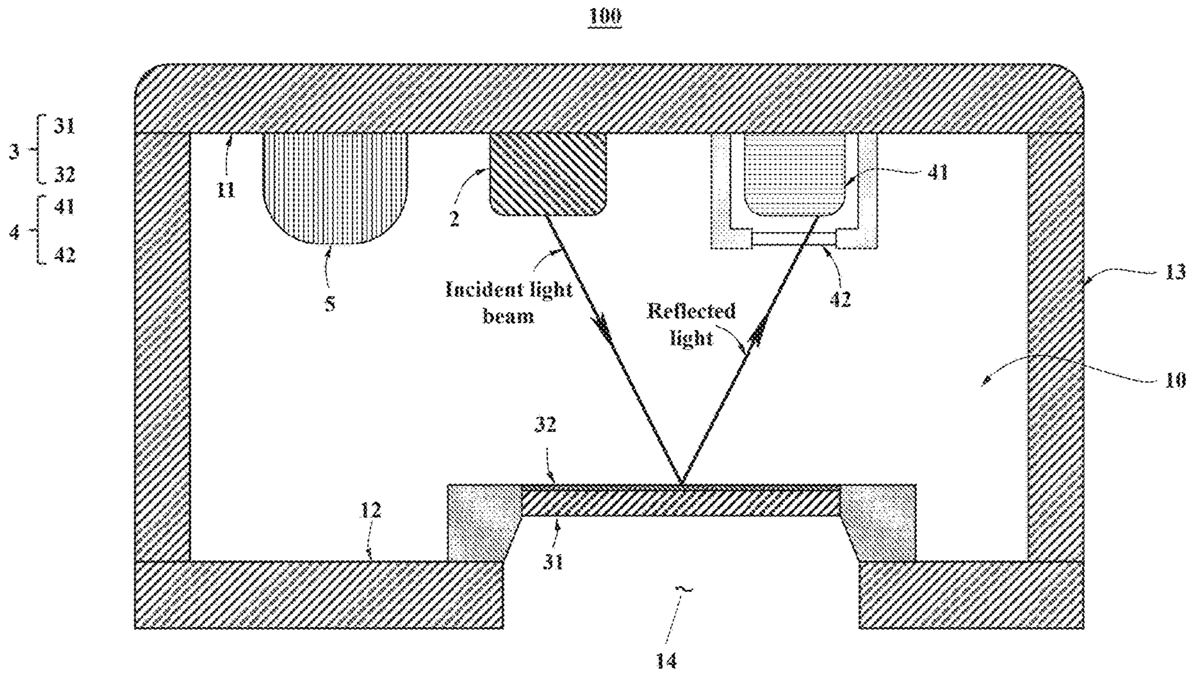
FIG. 1 is an schematic structural diagram of a MEMS optical microphone in accordance with an exemplary embodiment of the present disclosure.

As shown in FIG. 1, an embodiment of the present disclosure provides an MEMS optical microphone 100 includes a housing 1 including an inner cavity 10, a light source 2, a MEMS module 3, a light detection unit 4, and an integrated circuit module (ASIC) 5. The housing 1 includes a lid 11, a PCB 12 opposite to the lid 11 and a side wall 13 connecting the lid 11 and the PCB 12; the lid 11, the PCB 12 and the side wall 13 encloses the inner cavity 10. A sound port 14 is provided on the PCB 12 to communicate the inner cavity 10 with outside. Specifically, the light source 2 is configured to emitting a light beam, such as laser. The MEMS module 3 includes a membrane 31 suspended above the sound port 14, and a first reflective coating 32 coated on a surface of the membrane 31 facing the light source 2 and configured to reflect the light beam emitted by the light source 31. The light detection unit 4 is configured to detecting light reflecting from the first reflective coating 32, and includes a photo detector 41 configured to convert light intensity into photo current and an optical filter 42 with a variable transmittance hoisted above the photo detector 41.

As shown in FIG. 1, in the MEMS optical microphone 100, the MEMS module 3 is mounted on the PCB 12 and covers the sound port 14, the light source 2 and the light detection unit 4 are both mounted on the lid 11.

Figure 5:
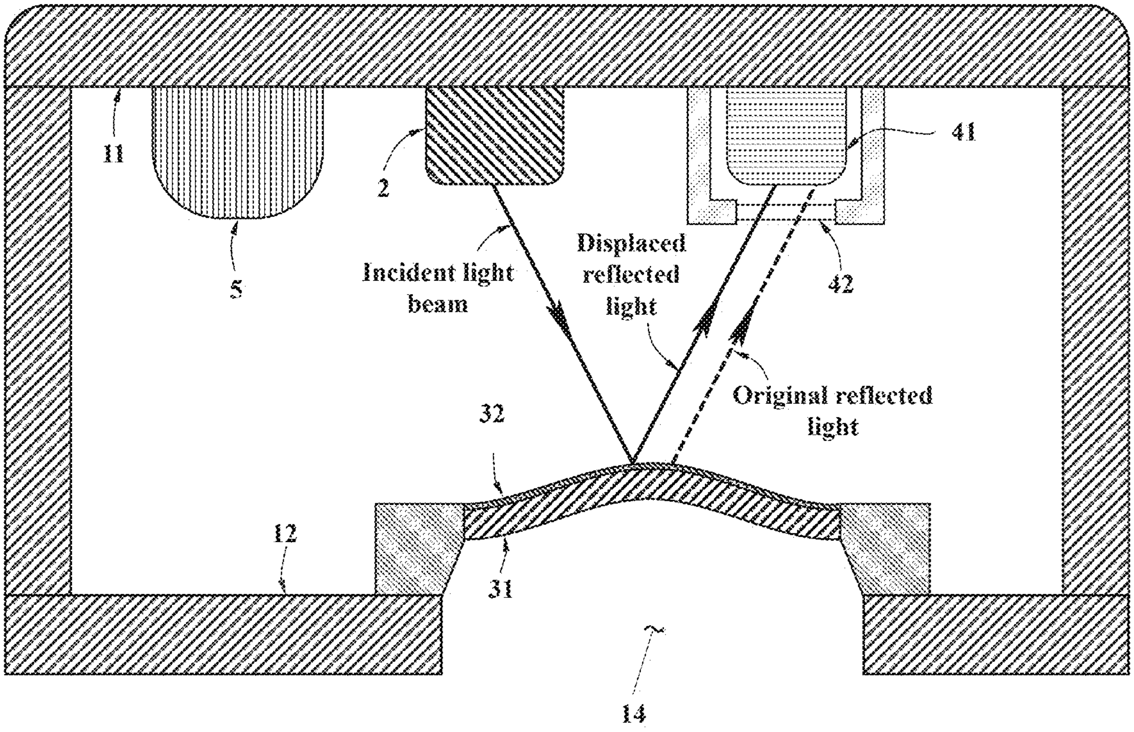
FIG. 5 is a schematic structural diagram of the MEMS optical microphone in FIG. 1 when pressure signal is applied on a membrane.

The light source 2 emits the light beam towards the first reflective coating 32. Then, the incident light completely reflects off the first reflective coating 32 on the membrane 31 and directs to the optical filter 42 before entering the photo detector 41. The incident light first passes through a location on the optical filter 42 of a given transmittance allowing a certain level of light intensity which converts into photo-current by the photo detector 41. The photo-current is transmitted to the ASIC 5, so as to realize transformation from acoustic signal (or pressure signal) to optical signal and then to electrical signal. As shown in FIG. 5, when the pressure or sound signal varies, it changes the deflection of the membrane 31 and hence the direction or path of the reflected light beam from the first reflective coating 32 on the membrane 31. As a result, the reflected light follows different paths and passes through different locations on the optical filter 42 that result in a variable photo-current. Thus, the light intensity detected by the photo detector 41 depends on the location on the optical filter 42 through which the reflected light passes.

Specifically, the optical filter 42 is made of a transparent material, for instance, a quartz glass that is patterned with an opaque or reflective material. In the present disclosure, the optical filter 42 with a variable transmittance is provided.

Figure 2A:
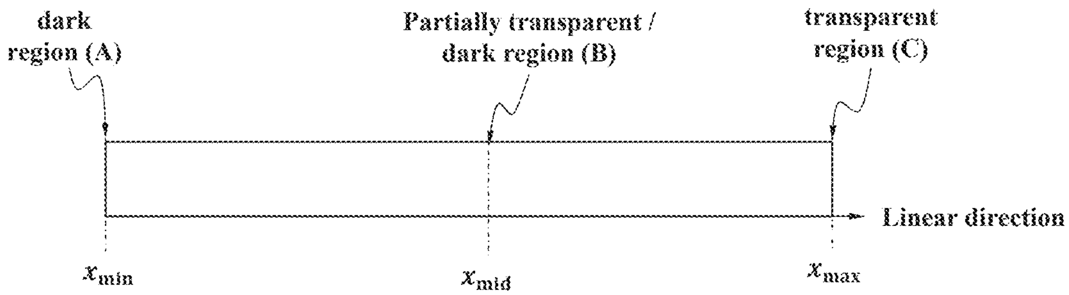
FIG. 2A is a cross section schematic diagram of an optical filter of the MEMS optical microphone in accordance with a first exemplary embodiment of the present disclosure.
Figure 2B:
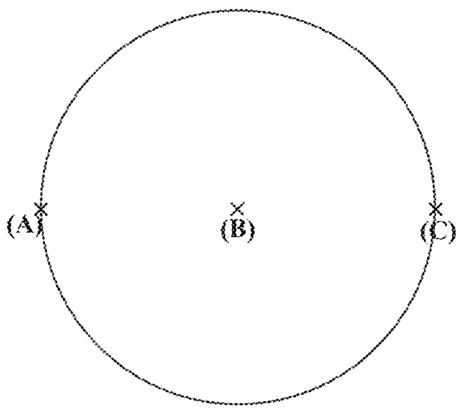
FIG. 2B is a top view schematic diagram of the optical filter of the MEMS optical microphone in FIG. 2A.

As shown in FIG. 2A and FIG. 2B, the transmittance of the optical filter 42 varies along a linear direction between the two edges of the optical filter 42 so as the transmittance is minimum at 'A' and maximum at 'C'. Specifically, a region labeled 'A' has zero transmittance (dark region), 'C' has maximum transmittance (transparent region); between A and C the transmittance gradually varies such as at the middle labeled with 'B', it is 50% (partially transparent/dark region). It should be noted that X represents location on the optical filter along the linear direction. For instance, Xmin represents a location of the A region having zero transmittance. And Xmid and Xmax represents a location of the B region and the C region, respectively.

Figure 2C:
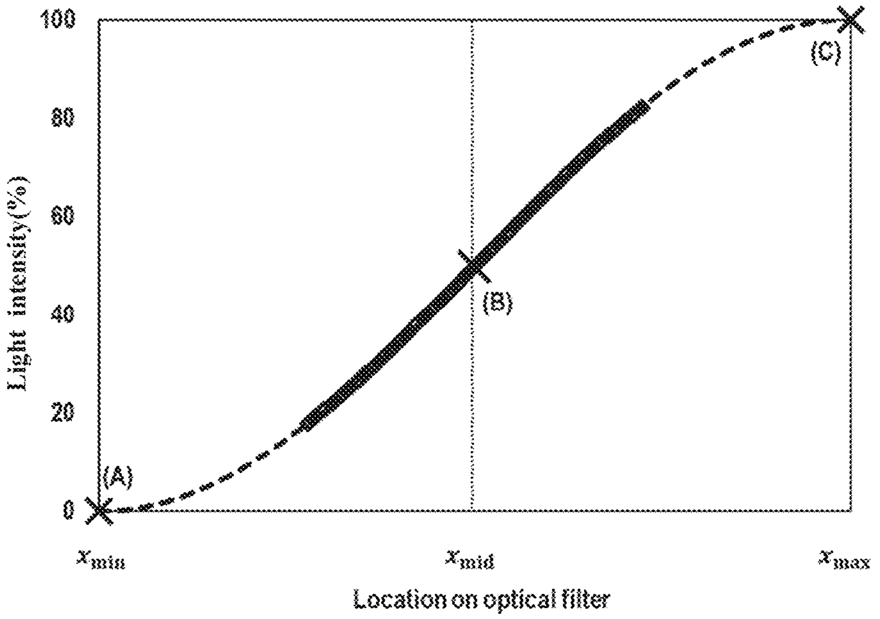
FIG. 2C is a schematic diagram showing relationship between light intensity and optical transmittance of different locations on the optical filter in FIG. 2A.

As shown in FIG. 2C, light intensity variation along the linear direction across the optical filter 42 is presented, indicating that light intensity varies from no transmission to maximum transmission and corresponds to the regions shown in FIG. 2A and FIG. 2B. The linear region is also marked with solid line that determines a dynamic range of the MEMS optical microphone 100.

Figure 3A:
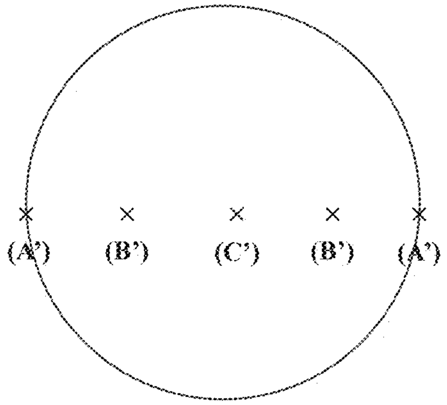
FIG. 3A is a top view schematic diagram of an optical filter of the MEMS optical microphone in accordance with a second exemplary embodiment of the present disclosure.
Figure 3B:
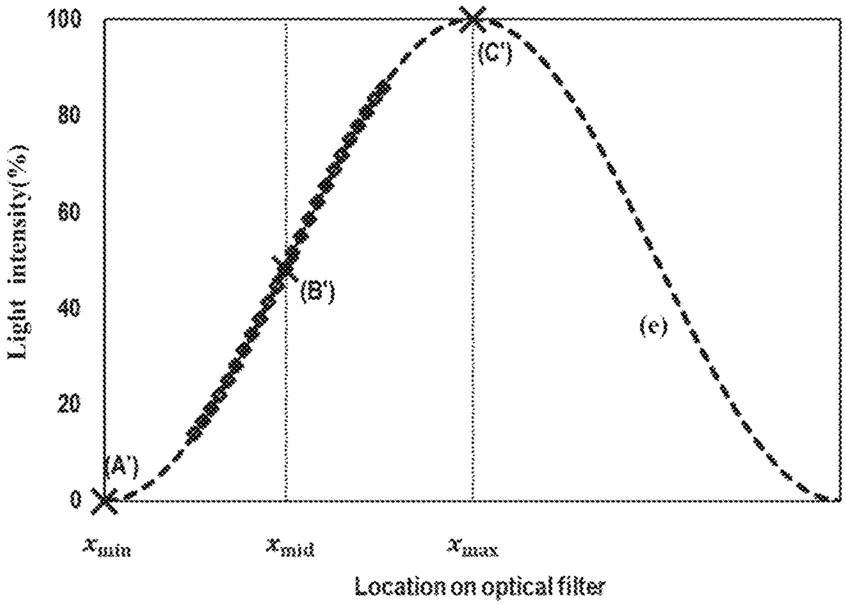
FIG. 3B is a schematic diagram showing relationship between light intensity and optical transmittance of different locations on the optical filter in FIG. 3A.

As shown in FIG. 3A, the transmittance of the optical filter 42 varies radially from a center region (labeled with C') of the optical filter 42. For instance, the central region C' has a maximum transmittance which gradually reduces radially and becomes the minimum at an edge region (labeled with A') of the optical filter 42. The light intensity variation across the optical filter 42 in a radial direction is presented in FIG. 3B where labels (A', B'&C') represents the locations on the optical filter 42 as shown in FIG. 3A. In this embodiment, the sensitivity of the MEMS optical microphone 100 has increased.

Figure 4A:
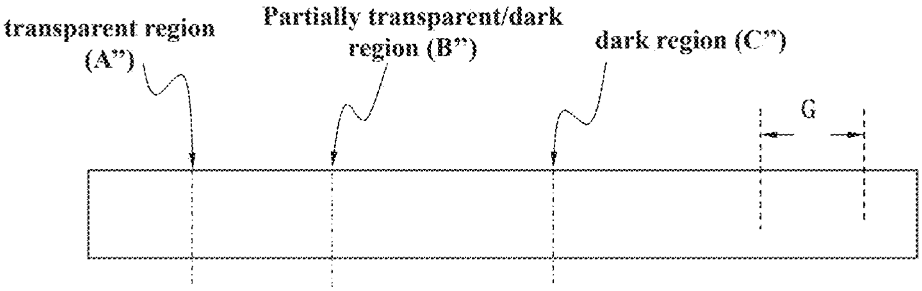
FIG. 4A is a cross section schematic diagram of an optical filter of the MEMS optical microphone in accordance with a third exemplary embodiment of the present disclosure.
Figure 4B:
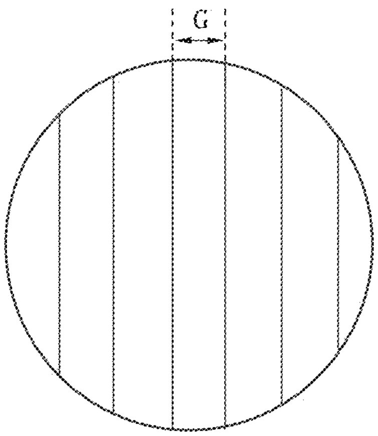
FIG. 4B is a top view schematic diagram of the optical filter of the MEMS optical microphone including a plurality of linear gratings in FIG. 4A.
Figure 4C:
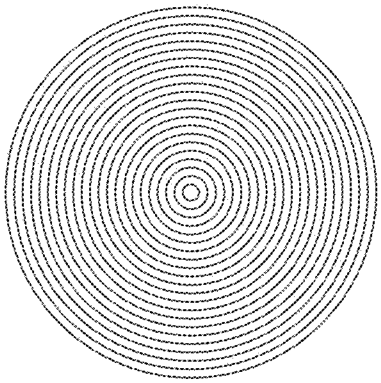
FIG. 4C is a top view schematic diagram of the optical filter of the MEMS optical microphone including a plurality of ring gratings in FIG. 4A.
Figure 4D:
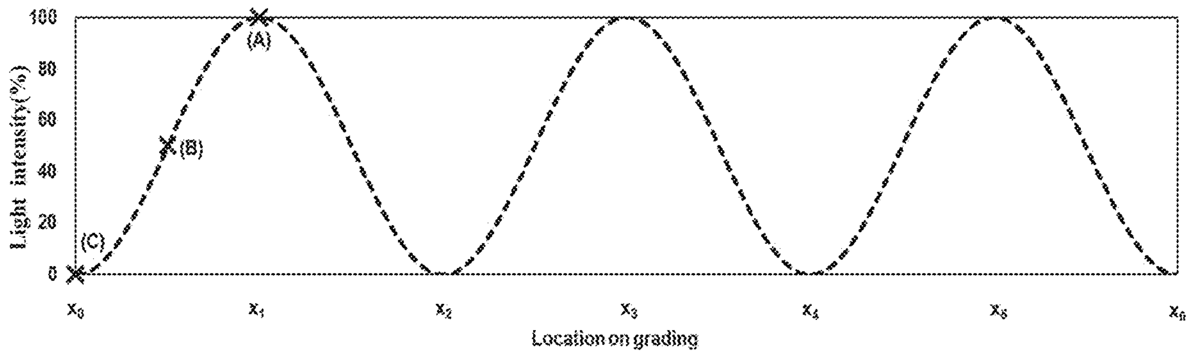
FIG. 4D is a schematic diagram showing relationship between light intensity and optical transmittance of different locations on the optical filter in FIG. 4A.

As shown in FIG. 4A, the optical filter 42 includes a plurality of gratings G; each grating has a gradient of transmittance. In each grating, the transmittance gradually varies forming a dark region (labeled C") and a transparent region (labeled A") in one grating. Also a partially transparent/dark region (labeled B") is shown in FIG. 4A. It can be understood that the pitch of the grating is chosen to cover a maximum deflection of the reflected light from the first reflective coating 32 on the membrane 31. The grating is a linear grating or a ring grating. Example illustrations of a cross-section of such a grating are shown in FIG. 4A with two embodiments including linear gratings as shown in FIG. 4B and ring gratings as shown in FIG. 4C. The light intensity variation across the optical filter 42 with gratings is presented in FIG. 4D. It is clearly shown that the transparent region A" with the maximum transmittance has the maximum light intensity.

Using the optical filter presented in FIG. 2A, FIG. 3A, and FIG. 4A, the operation of the MEMS optical microphone 100 is explained with an arrangement as shown in FIG. 1 and FIG. 5. As shown in FIG. 1, in the absence of external pressure, the membrane 31 rests at its equilibrium position. A light beam from the light source 2 (such as laser) is incident at an angle on the reflective side of the first reflective coating 32 on the membrane 31 from where the light reflects along a path that is shown with a dash line in FIG. 5. The reflected light is then directed to the photo detector 41 that has the optical filter 42 above it. The reflected light first passes through a certain location (say at the dark region) of the optical filter 42 before reaching to the photo detector 41. The transmittance of the dark location is T_dark. This implies, no or little amount of light will pass through it and generates a small photo-current (i_dark), which corresponds to no external pressure condition, that is, P=P_min Pa.

In contrast, as shown in FIG. 5, when an external pressure or sound signal is applied on the membrane 31, it deflects the membrane 31 from its equilibrium position. Due to the displacement, the path or direction of the reflected light beam on the first reflective coating 32 also changes from its original path or direction, the change in the path or direction depends on the amount of displacement in the membrane 31. The reflected light beam now passes through another location on the optical filter 42 that have a different transmittance, say transparent region, of transmittance T_trans. As a result, a certain level of light would now pass through the optical filter 42 and generate a photo-current (i_trans) at the photo detector 41; the amount of photo-current, i_trans, corresponds to the maximum pressure (P_max) applied on membrane 31. This implies, when the dynamic pressure varies from P_min to P_max, the membrane 31 will displace from its equilibrium position to maximum displacement that changes the path or direction of the reflected light from the membrane 31. The reflected light directs to different locations through the optical filter 42 and hence generates a variable photo-current that varies from i_dark to i_trans.

Figure 6:
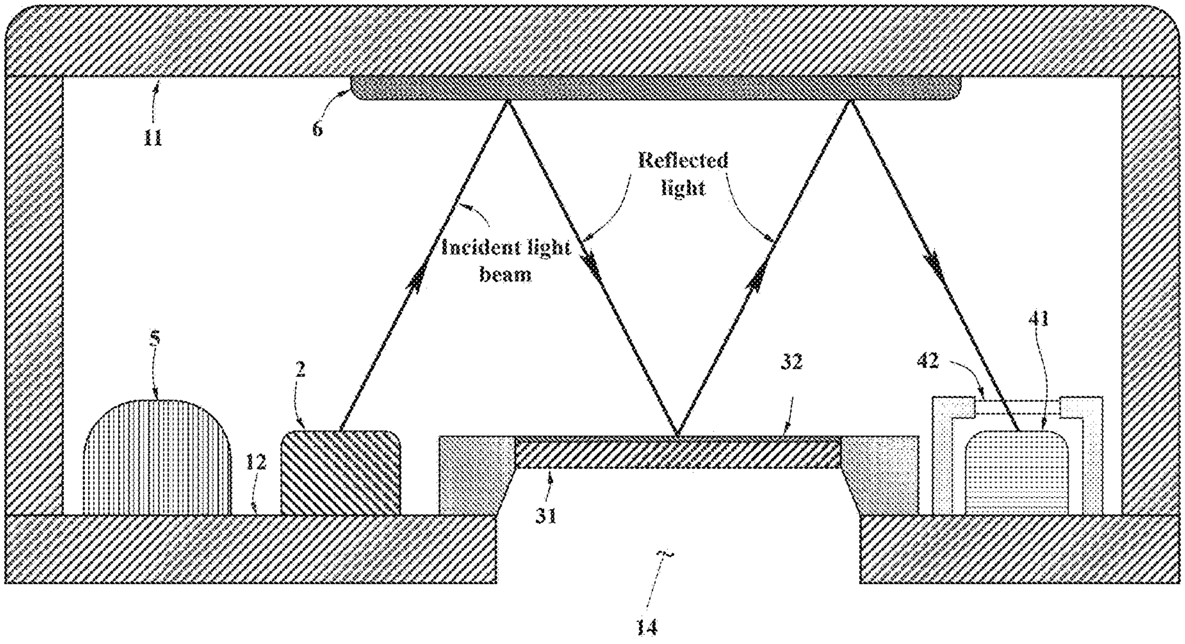
FIG. 6 is a schematic diagram of a MEMS optical microphone with a second reflective coating.

As shown in FIG. 6, a MEMS optical microphone with different arrangement from the MEMS optical microphone 100 in FIG. 1 is provided. Specifically, the light source 2 and the light detection unit 4 are both mounted on the PCB 12. A second reflective coating 6 is coated on the lid 11. The second reflecting coating 6 is arranged opposite to the light source 2 and the first reflective coating 32. It should be noted that the MEMS microphone 22 uses the same optical filter 42 with the MEMS optical microphone 100.

In the MEMS optical microphone shown in FIG. 6, the light detection unit 4 and ASIC 5 are placed on the same side with the MEMS module 3 on the PCB 12 whereas the second reflecting coating 6 is placed on the opposite to them. In principle, the light beam emitted by the light source 2 impinges on the second reflecting coating 6 from where it directs to the first reflective coating 32 on the membrane 31. The light beam from the first reflective coating 32 reflects back to the second reflecting coating 6 before it directs to the optical filter 42 and photo detector 41. As explained in the previous embodiment, when the sound or pressure signal displaces the membrane 31, it changes the path/direction of the light beam on the first reflective coating 32 and hence causes the light beam to pass through the different locations on the optical filter 42. The variable light intensity generates a variable photo-current at the photo detector 41 that corresponds to amount of applied pressure signal.

Figure 7:
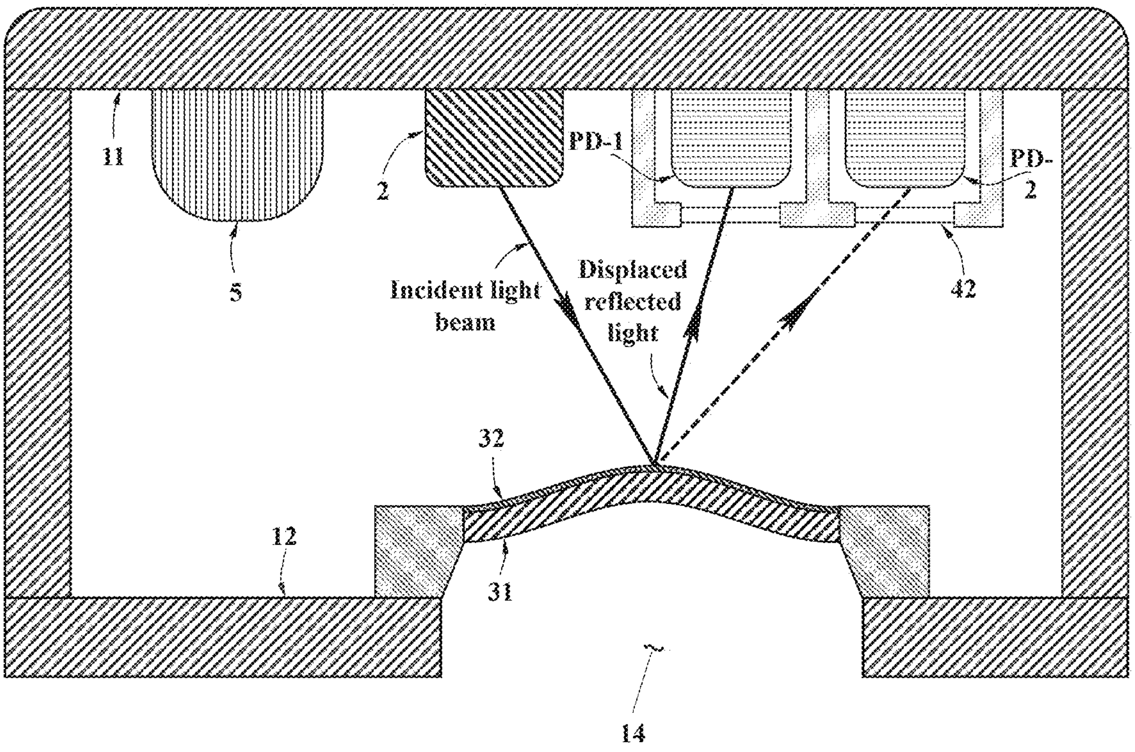
FIG. 7 is a schematic structural diagram of a MEMS optical microphone with two photo detectors.
Figure 8:
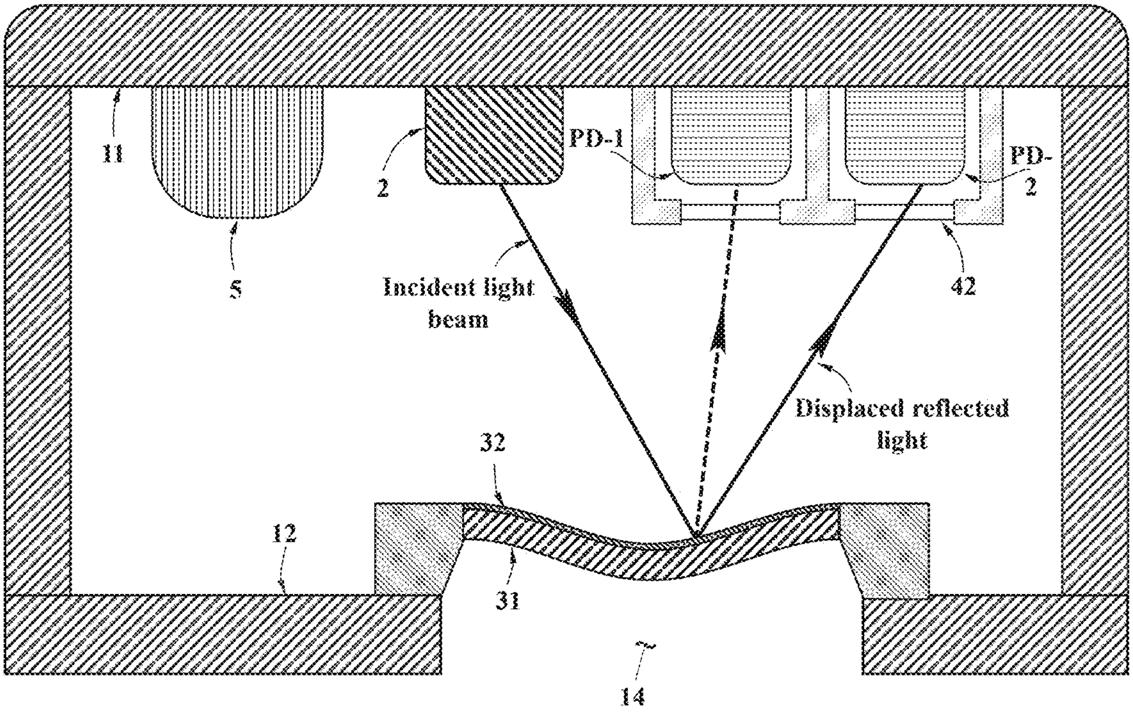
FIG. 8 is a schematic structural diagram of a MEMS optical microphone with two photo detectors.

Both high sensitivity and wider dynamic range are desirable for the MEMS optical microphone. The sensitive range of the MEMS optical microphone is limited to the linear optical output when the variable pressure signal is applied whereas the dynamic range determines the minimum and maximum pressure that can be measured. In order to increase the dynamic range of the MEMS optical microphone with maintaining its sensitivity, a MEMS optical microphone with two adjacent photo detectors 41 is provided as shown in FIGS. 7-8. In this embodiment, the two photo detectors 41 named as PD-1 and PD-2 with their respective optical filters 41 on them. The metallic pattern on each optical filter 42 has an off-set so as each optical filter 42 allow a different level of light intensity for the same pressure signal.

Figure 9:
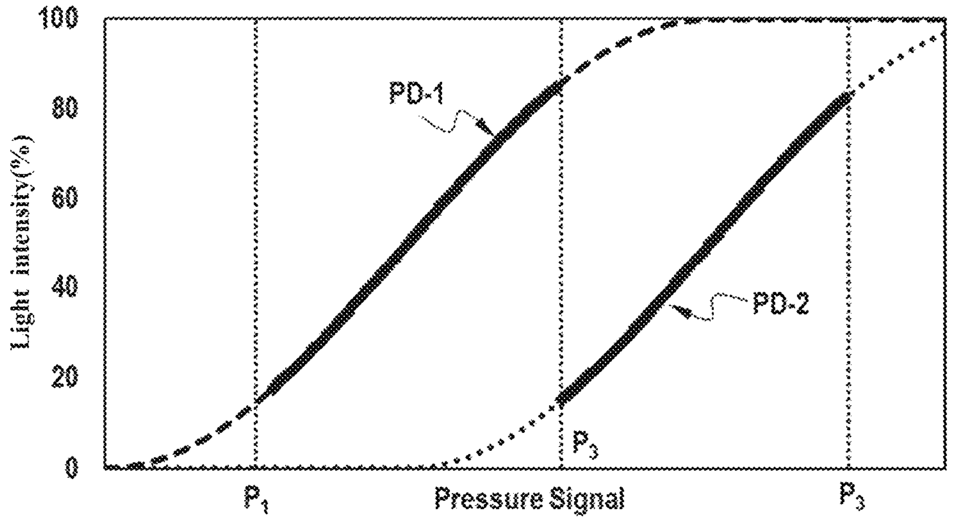
FIG. 9 is a schematic diagram showing relationship between light intensity and optical transmittance of the MEMS optical microphone in FIG. 7 and the MEMS optical microphone in FIG. 8.

For instance, for the pressure range from P1 to P2, the photo detector PD-1 generates the optical signal linear to the applied pressure signal; however, for the same range of the pressure, the pattern on the optical filter 42 placed above the photo detector PD-2 is designed so that the photo detector PD-2 would have no optical signal. When pressure signal exceeds P2, say P2 to P3, the optical output at the photo detector PD-1 is no longer remains linear; however, the optical signal at the photo detector PD-2 becomes linear. Therefore, for the pressure ranges from P2 to P3, the photo detector PD-2 gives a linear optical signal. The photo detector PD-1 senses the linear variation in pressure from P1 to P2 whereas the photo detector PD-2 generates linear optical signal from P2 to P3; thus, as shown in FIG. 9, in total, a pressure range P1 to P3 can be sensed linearly with the combination of two the photo detector PD-1 and PD-2 without degrading the sensitivity. By using at least two photo detectors and correctly designing the pattern off-set on the optical filter attached on each photo detector, the dynamic range of the MEMS optical microphone can be increased.

Compared with the related art, the present disclosure improves the sensitivity and the dynamic range of the MEMS optical microphone by providing an optical filter with variable transmittance. The dynamic range of the MEMS optical microphone is improved, thus a wider range of sound or pressure signals can be sensed, and a higher sensitivity to change of light intensity caused by the sound or pressure signals can be realized.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A MEMS (micro-electromechanical system) optical microphone, comprising:
- a housing including an inner cavity and a sound port communicating the inner cavity with outside;
- a light source configured to emitting a light beam;
- a MEMS module including:
  - a membrane suspended above the sound port; and
  - a first reflective coating coated on a surface of the membrane facing the light source and configured to reflect the light beam;
  - a light detection unit, including:
  - a photo detector configured to convert light intensity into photo current; and
  - an optical filter with a variable transmittance hoisted above the photo detector; wherein
- the light beam reflected by the first reflective coating is detected by the photo detector after passing through the optical filter.

2. The MEMS optical microphone as claimed in claim 1, wherein the transmittance of the optical filter varies along a linear direction between two edges of the optical filter.

3. The MEMS optical microphone as claimed in claim 1, wherein the optical filter comprises a central region with a maximum transmittance and an edge region with a minimum transmittance; the transmittance of the optical filter reduces radially from the central region towards the edge region.

4. The MEMS optical microphone as claimed in claim 1, wherein the optical filter comprises a plurality of gratings; each grating has a gradient of transmittance.

5. The MEMS optical microphone as claimed in claim 4, wherein the grating is a linear grating or a ring grating.

6. The MEMS optical microphone as claimed in claim 1, wherein the housing comprises a lid, a PCB opposite to the lid and a side wall connecting the lid and the PCB; the lid, the PCB and the side wall encloses the inner cavity.

7. The MEMS optical microphone as claimed in claim 6, wherein the sound port is provided on the PCB; the MEMS module is mounted on the PCB and covers the sound port.

8. The MEMS optical microphone as claimed in claim 7, wherein the light source and the light detection unit are both mounted on a surface of the housing opposite the sound port.

9. The MEMS optical microphone as claimed in claim 6, further comprising a second reflecting coating coated on the lid; the light detection unit and the light source are both arranged on a side of the housing with the sound port; the second reflecting coating are arranged opposite to the light source and the first reflective coating.

10. The MEMS optical microphone as claimed in claim 8, wherein the light detection unit comprises two adjacent photo detectors with respective optical filter above them.

* * * * *